United States Patent Office 2,802,828
Patented Aug. 13, 1957

2,802,828
NEW DERIVATIVES OF HYDROXYLATED ALKALOIDS

Maurice Jeanson, Paris, France, assignor to Laboratoire de Recherches Biologiques Laborec, Paris, France, a French body corporate No Drawing. Application March 26, 1954, Serial No. 419,113

Claims priority, application France March 30, 1953

6 Claims. (Cl. 260—285)

The present invention relates to new derivatives of alkaloids. It is known that alkaloids are defined in treatises and chemical dictionaries as nitrogenous organic bases which exist in vegetables, possess definite physiological properties and give reactions common to a certain number of reagents of alkaloids, or are capable of being produced by synthesis in accordance with structures resembling those of vegetable alkaloids and giving the same general reactions. These bodies possess physiological properties of considerable interest and they are usually employed in aqueous solution in the form of mineral salts for analgesic or therapeutic purposes.

The invention has for object to provide new derivatives of hydroxylated alkaloids having the advantageous characteristic of being lipid-soluble, which gives them new properties and a special tropism. It has been discovered, furthermore, that these new derivatives are less toxic than alkaloids from which they are derived; they may therefore be employed in stronger and more effective doses.

The compounds according to the invention are the result of the at least partial esterification by fatty acids of the hydroxyl groups of hydroxylated alkaloids of formula $A(OH)n$, in which A is a salified alkaloid nucleus or a non-salified alkaloid nucleus on which are fixed the alcoholic or phenolic hydroxyl groups OH, and $n$ is an integer comprised between 1 and 3. These compounds satisfy the formula

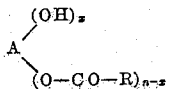

in which A and $n$ have the aforementioned significations, $x$ is an integer equal to 0, 1 or 2, and R is a fatty acid radical of formula R—COOH.

The expression fatty acids is intended to mean in the ensuing description those fatty acids defined by Harry J. Denel, Jr. (The lipids, vol. 1, p. 5), i. e. acids taken from fatty natural substances which are insoluble or only slightly soluble in water and soluble in fat solvents, or acids capable of being produced by synthesis in accordance with structures resembling those of natural fatty acids and having the same physico-chemical properties. The first term of this series is constituted by caprylic or octanoic $CH_3$—$(CH_2)_6$—COOH=acid (Lebeau and Courtois, Traité de Pharmacie Chimique, 2nd edition, 1938, Tome I, Page 957).

The invention has for further object to provide a process of preparation of the aforementioned new compounds. This process is characterized in that it comprises reacting on an alkaloid of formula $A(OH)n$, wherein A and $n$ have the aforementioned significations, a fatty acid or an active derivative of said acid such as a halide, an anhydrid or a lower alcohol ester.

Preference is however given to a halide of a fatty acid such as chloride, since it is more active.

The reaction is effected by refluxing in an anhydrous organic solvent such as benzene or xylene. The reaction mixture thus obtained is filtered hot so as to separate the alkaloid that has not reacted and the esterified product crystallises on cooling the solution obtained.

The following examples illustrate the invention, without it being intended however to limit the latter thereto.

EXAMPLE 1.—DIMYRISTYL MORPHINE

The alcohol and phenol functions of the morphine are esterfied by two molecules of myristic acid. The molecular weight of the ester is 705.

To prepare this ester, a part of the previously dehydrated morphine is heated, with a reflux condenser, with 3.5 parts of myristyl chloride and 25 parts of xylene, for 2 hr. 30. The xylene solution of the diester hydrochloride formed is if desired separated from the morphine that has not reacted and is insoluble. The hydrochloride of the diester obtained crystallizes on cooling.

To obtain the base, the hydrochloride is dissolved in chloroform and is extracted with an alkaline solution until elimination of the Cl ions. The chloroform solution of the base is washed and dried. The base obtained on concentrating the chloroform solution is purified by crystallization in acetone.

The characteristics of the hydrochloride and the base are the following:

(a) *Hydrochloride.*—Fine mat white crystals, without bitterness.

Analyses:

1. Quantitative analysis of hydrochloric acid: 4.8 to 4.90% of HCl by determining the acid number in an alcoholic medium with decinormal sodium hydroxide in the presence of bromothymol blue (theoretical=4.90%).

2. Ester index: 72 to 75 determined by refluxing for 15 minutes with decinormal alcoholic sodium hydroxide in the presence of bromothymol blue (theoretical=75).

3. Analysis of the product of the preceding operation: it yields 57–60% myristic acid (theoretical=61.5%).

Instantaneous melting point (Maquenne block): 184° C.

Solubility: The hydrochloride is very soluble in cold chloroform, slightly soluble in cold and very soluble in hot methanol, ethanol, acetone, benzene and benzenic solvents, insoluble in ether and petroleum ether and very slightly soluble in water.

(b) *Base.*—Shiny white crystals, without bitterness.

Instantaneous melting point (Maquenne block): 90° C.

Solubility: The base is soluble in cold chloroform, methanol, ethanol, benzene, benzenic solvents, and ether, insoluble in petroleum ether and in water and very soluble in vegetable oils.

EXAMPLE 2.—MYRISTYL BENZYL MORPHINE OR MYRISTYL-PERONINE

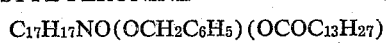

The free alcohol function of the benzyl morphine is esterified by one molecule of myristic acid. The molecular weight of the ester is 585.

This compound is obtained in heating with a reflux condenser 1 part of benzyl morphine with 1.1 parts of myristyl chloride and 10 parts of xylene for 2 hr. 30. The hydrochloride of the myristic ester of benzyl morphine crystallizes on cooling.

To obtain the base, the hydrochloride is suspended in water (1 part hydrochloride to 4 parts of water) and the mixture is alkalised cold by ammoniac in the presence of ether. The ethereal base solution is washed and dried.

The base crystallizes by concentration in a vacuum at low temperature.

The characteristics of the hydrochloride and the base are the following:

(a) *Hydrochloride.*—Mat white tasteless crystals.

Analyses:

1. Quantitative analysis of hydrochloric acid: 5.45–5.8% in conditions identical to those of the previous ester (theoretical: 5.8%).

2. Ester index: 87–89, determined by refluxing for 15 minutes with decinormal alcoholic sodium hydroxide (theoretical=90).

3. Analysis of the product of saponification: myristic acid=34.5–36% (theoretical=36.5%); benzyl morphine=58.5–60% (theoretical=60.5%).

Instantaneous melting point (Maquenne block): 198°–199° C.

Solubility: The hydrochloride is very soluble in cold chloroform, slightly soluble in cold and very soluble in hot methanol, ethanol, acetone, benzene and benzenic solvents. It is insoluble in ether and petroleum ether, very slightly soluble in neutral water, and slightly soluble in hot vegetable oils.

(b) *Base.*—Shiny white tasteless crystals.

Melting point (Maquenne block):
　Instantaneous: 41° C.
　Progressive heating: 37° C.

Solubility: The base is very soluble in methanol, ethanol, benzene, acetone, chloroform and ether, insoluble in petroleum ether and in water, very soluble in vegetable oils.

EXAMPLE 3.—MONOMYRISTIC ESTER OF ATROPINE $C_{17}H_{22}NO_2(OCOC_{13}H_{27})$

Myristic acid is fixed on the free alcohol function of the tropic acid entering in the formula of atropine. The molecular weight of the ester is 499.2.

To prepare this ester, 1 part of atropine with 1.5 parts of myristyl chloride and 10 parts of toluene are heated with a reflux condenser for 15 minutes.

On cooling, the hydrochloride of the ester crystallizes. It is separated, washed with ether and dried. To obtain the base, it is alcalised with sodium bicarbonate in the presence of ether. The ethereal phase is washed, dried and evaporated in a vacuum.

The characteristics of the hydrochloride and the base are the following:

(a) *Hydrochloride.*—Fine white crystals without bitterness.

Analyses:

1. Quantitative analysis of the hydrochloric acid. It yields 6.8% of hydrochloric acid (identical to the theoretical yield).

2. Ester index=104 (identical to the theoretical index).

3. Analysis of the residue of the preceding operation. 39–41% of myristic acid is obtained (insoluble in acid water and soluble in petroleum ether). The theoretical percentage is 42.5%.

Instantaneous melting point (Maquenne block): 129° C.

Solubility: The hydrochloride is very soluble in cold chloroform, a little less soluble in cold methanol, ethanol, acetone and benzene. It is insoluble in cold but soluble in hot toluene and xylene, insoluble in ether and petroleum ether. With neutral water it gives a clear solution at a weak concentration which becomes viscous when the concentration is increased.

This solution precipitates with alkalies, strong acids and salts such as chloride and sodium sulfate.

The hydrochloride dissolves in vegetable oils above 115° C. but precipitates on cooling.

(b) *Base.*—Slightly coloured crystals which have a fatty and soapy appearance and are without bitterness.

Instantaneous melting point (Maquenne block): 43° C.

Solubility: The base is soluble in cold chloroform, ether, acetone, benzene and benzenic solvents, slowly soluble in cold and rapidly soluble in hot methanol, ethanol and slightly soluble in petroleum ether. It is insoluble in water and very soluble in vegetable oils at a temperature less than 40° C.

EXAMPLE 4.—DIMYRISTIC ESTER OF BOLDINE $C_{19}H_{19}NO_2(OCOC_{13}H_{27})_2$.

The two free phenol functions of boldine (at 3 and 7) are esterified by two molecules of myristic acid. The molecular weight of the ester is 747.2.

To prepare this ester, 1 part of boldine and 0.75 part of myristyl chloride in xylene (30 parts) are heated with a reflux condenser for 2 hr. 30. After cooling, the boldine hydrochloride is eliminated by filtration. The xylene solution which contains the ester of the base with an excess of fatty acid is distilled dry under a vacuum. The fatty acid is eliminated by repeated crystallizations in ether, petroleum ether and ethylic alcohol.

The characteristics of the base are the following:

Shiny crystals having a greyish white colour without any bitterness.

Melting point (Maquenne block):
　Instantaneous: 84° C.
　By progressively heating: 74° C.

*Analysis.*—After refluxing for two hours with decinormal alcoholic sodium hydroxide, there is obtained:

Myristic acid=60–62%
Theoretical quantity=62.5%

Solubility: The ester of the base is soluble in cold ether, petroleum ether, acetone, chloroform, benzene and dioxane. It is slightly soluble in cold and a little more soluble in hot ethylic alcohol, insoluble in water whatever the pH, fairly soluble in vegetable oils, especially in hot vegetable oils.

EXAMPLE 5.—MYRISTIC ESTER OF EPHEDRINE $C_{10}H_{14}N(OCOC_{13}H_{27})$

The secondary alcohol function of ephedrine is esterified by one molecule of myristic acid. The molecular weight of the ester is 375.

To prepare this ester, 1 part of ephedrine is heated with 0.75 part of myristyl chloride in 100 parts of benzene with a reflux condensor for 1 hr. 30. The ephedrine hydrochloride formed is separated by filtration. The benzene is distilled in a vacuum and the dry extract is re-crystallized in ice-cold ether. The ester of the base is thus obtained and the characteristics of this ester are the following: Entangled, long, fine, white crystals without bitterness.

*Quantitative analysis of the esterified fatty acid.*—By refluxing for 4 hours in normal alcoholic sodium hydroxide, 51% of myristic acid is liberated (theoretical amount). Instantaneous melting point (Maquenne block): 45° C.

Solubility: The ester is soluble in cold ether, petroleum ether, acetone, chloroform, benzene and ethylic alcohol. It is soluble in vegetable oils and insoluble in water whatever the pH of the latter.

EXAMPLE 6.—MONOMYRISTIC ESTER OF QUININE $C_{20}H_{23}N_2O(OCOC_{13}H_{27})$

The secondary alcohol function of quinine is esterified by one molecule of myristic acid. The molecular weight of the ester is 534.

To prepare this ester, 1 part of anhydrous quinine with 1 part of myristyl chloride and 30 parts of toluene are heated with a reflux condenser for two hours. The toluene is distilled in a vacuum until the residue is dry. The dry residue is extracted with ether or petroleum ether in order to eliminate the fatty acid. The insoluble part is formed of a non-defined myristic ester hydrochloride.

To obtain the base, this hydrochloride is dissolved in slightly acid water and it is alkalised with sodium bicarbonate in the presence of ether. The ethereal solution is washed and dried. The base is obtained by evaporation.

The characteristics of the ester are the following:

(a) Non-defined hydrochloride.

The product is amorphous, slightly coloured and rapidly alters in air, resulting in a soft resinous product, brown in colour. Without bitterness.

It is soluble in alcohol, chloroform, benzene, acetone, soluble in neutral and acid water, insoluble in petroleum ether and ether, and slightly soluble in vegetable oils.

Quantitative analysis of the hydrochloric acid: It gives 9 to 10% of HCl according to the test portion by determining the acid number in alcoholic solution in the presence of bromothymol blue. This value is comprised between the theoretical value for monohydrochloride (6.4%) and that for dihydrochloride (12%).

(b) Base.—Thick liquid, slightly amber-like and uncrystallizable even at low temperature, not bitter.

It is soluble in methanol and ethanol, acetone, chloroform, benzene, ether and petroleum ether and vegetable oils, insoluble in neutral water.

Analysis.—After refluxing for 15 minutes in decinormal alcoholic sodium hydroxide, there is obtained:

Myristic acid=42.6%
Quinine=60.7%

(c) Dipicrate.—It is obtained by the action of a picric acid saturated solution in 95° alcohol added to 5% of glycerine, on a slightly acid aqueous solution of a non-defined hydrochloride. A pulverulent, clear yellow product.

Quantitative analysis of the picric acid.—42 to 44% by determining the acid number in an alcoholic medium in the presence of phenolphthalein (theoretical amount 46%).

Instantaneous melting point (Maquenne block): 86° C.

EXAMPLE 7.—MONOMYRISTIC ESTER OF MORPHINE $C_{17}H_{17}NO_2(OCOC_{13}H_{27})$

The phenol function of morphine is esterified by one molecule of myristic acid, the alcohol function remaining free. The molecular weight of the ester is 495.

To prepare this ester, 1 part of previously dehydrated morphine with 1.65 parts of myristyl chloride in 75 parts of toluene are heated with a reflux condenser for 1 hour. After cooling, the insoluble part is filtered off. The toluenic solution is distilled in a vacuum until the residue is dry. After extracting with sulphuric ether, the dry residue gives the hydrochloride.

The base is prepared in a way similar to that for the ester of atropine and it is recrystallized in methanol.

Characteristics of the hydrochloride: Rather soapy, tasteless, fine white crystals.

Analyses:

1. Hydrochloric acid: 6.8 to 7.2% (theoretical =7.4%).
2. Ester index: 108 to 110 (theoretical=113).
3. Analysis: myristic acid 42 to 43% (theoretical =46%).
4. Instantaneous melting point (Maquenne block): 248° C.

Solubility: The hydrochloride is very soluble in cold chloroform, a little less in ethanol, acetone, benzene, toluene and dioxane, insoluble in ether and petroleum ether, very slightly soluble in water.

Characteristics of the base: Tasteless, fine mat white crystals.

Melting point (Maquenne block):
Progressive heating=84° C.
Instantaneous=89° C.

Solubility: The base is soluble in chloroform, ether, petroleum ether, alcohol, acetone, benzene and toluene, insoluble in water and soluble in vegetable oils.

EXAMPLE 8. — MYRISTIC ESTER OF CODEINE
$C_{17}H_{17}NO(OCH_3)(OCOC_{13}H_{27})$

The free alcohol function of the codeine is esterified by one molecule of myristic acid. The molecular weight of the ester is 509.

To prepare this ester, 1 part of previously dehydrated codeine with 1.3 parts of myristyl chloride and 14 parts of xylene are heated with a reflux condenser for 2 hr. 30. The hydrochloride of the myristic ester of codeine crystallizes on cooling. A re-crystallization is effected in alcohol.

The base is obtained in the same conditions as that for the ester of atropine.

Characteristics of the hydrochloride: Tasteless, mat white crystals.

Analyses:

1. Quantitative analysis of the hydrochloric acid: 6.7 to 6.85% (theoretical=6.7%).
2. Ester index: 103 (Identical to the theoretical index).
3. Analysis of the product of the saponification: Myristic acid: 39 to 40% (theoretical=42%). Codeine: 50 to 53% (theoretical=55%). Instantaneous melting point (Maquenne block): 224–225° C.

Solubility: It is identical to that of the hydrochloride of myristyl benzyl morphine.

Characteristics of the base: White crystals, slightly coloured with yellow, a slightly fatty consistency.

Melting point (Maquenne block):
Instantaneous: 47° C.
Progressive heating: 35° C.

Solubility: Identical to that of myristyl benzyl morphine.

There were also prepared other esters of fatty acids and of codeine of the general formula:

$C_{17}H_{17}NO(OCH_3)(OCOR)$ wherein R is a hydrocarbonated radical of a fatty acid RCOOH. In this way the following esters of fatty acids were prepared:

Capric acid $CH_3(CH_2)_8COOH$
Lauric acid $CH_3(CH_2)_{10}COOH$
Stearic acid $CH_3(CH_2)_{16}COOH$
Behenic acid $CH_3(CH_2)_{20}COOH$
Pelargonic acid $CH_3(CH_2)_7COOH$
Oleic acid $CH_3(CH_2)_7-CH=CH-(CH_2)_7COOH$ These esters are prepared according to a mode of operation identical to that employed for myristyl codeine.

For 1 part of codeine there was utilized:

1.2 parts of acid chloride for the 1st and 2nd acids
2.1 parts of acid chloride for the 3rd acid
3.5 parts of raw behenyl for the 4th acid
1 part of acid chloride for the 5th acid
2 parts of acid chloride for the 6th acid The corresponding bases are prepared in a way similar to that for myristic ester. The behenic and stearic esters are recrystallized in methylic alcohol.

Characteristics of the hydrochloride: They have an appearance identical to that of myristic ester except for those of pelargonic and oleic esters of fatty consistency, the first being of grey color and the second pale brown.

Instantaneous melting point (Maquenne block):
Capric=203° C.
Lauric=214° C.
Stearic=232–233° C.
Behenic=175° C.
Pelargonic=186° C.
Oleic=178° C.

Analyses

| Ester | Molecular weight | Theoretical percentage of hydrochloric acid | Hydrochloric acid percentage obtained by the acid number | Theoretical ester index | Ester index found | Theoretical percent fatty acid | Percent fatty acid found | Theoretical percent anhydrous codeine | Percent anhydrous codeine found |
|---|---|---|---|---|---|---|---|---|---|
| Capric | 490 | 7.50 | 7.3 to 7.5 | 114 | 108 to 112 | 35 | 26 to 31 | 61 | 60 |
| Lauric | 518 | 7.1 | 7.1 | 108 | 106 to 108 | 38.5 | 35 to 37 | 58 | 54 to 56 |
| Stearic | 602 | 6 | 5.9 to 6 | 93 | 84 to 90 | 47.5 | 43.5 to 46 | 49.7 | 46 to 49 |
| Behenic | 658 | 5.5 | 5.4 | 85 | 84 to 88 | 52.5 | 51 to 52 | 46 | 42 to 44 |
| Pelargonic | 476 | 7.65 | 7.6 | 117 | 115 | 33 | 20 to 23 | 63 | 51 to 54 |
| Oleic | 600 | 6.1 | 6 | 93 | 91 to 92 | 47 | 41 to 43 | 50 | 44 to 46 |

It should be noted that the relatively high solubility in water of the capric and pelargonic acids may explain the low figures obtained in the analysis after saponification, bearing in mind the small test portion taken (less than 0.3 gram of ester).

Solubilities: They are very near to that of the hydrochloride of myristyl codeine except for the behenic ester which dissolves less and not so readily in the different solvents when they are cold, and the oleic ester which is more easily soluble in the cold solvents, the general characteristics of solubility remaining however the same.

*Characteristics of the bases.*—Four of the bases obtained are liquid at normal temperature or are very slow to crystallize even in a freezer. These are the capric, lauric, pelargonic and oleic esters which give very viscous amber-coloured liquids. It seems, however, that the lauric and pelargonic esters would in the long run crystallize. The bases of the stearic and behenic esters give tasteless shiny white crystals.

Instantaneous melting point (Maquenne block):
  Stearic ester=59° C.
  Behenic ester=65° C.

Solubility: All the bases have in varying degrees the same solubility as myristyl codeine. The stearyl- and behenyl-codeine bases are slightly soluble in cold methanol and ethanol.

The new derivatives obtained according to the invention have the following notable properties:

1. They are less toxic than the starting alkaloids. For myristyl peronine for instance, experiments on man have shown that is five times less toxic than peronine.

2. They manifest a lipoid tropism. The bodies obtained are much more soluble in oil than the corresponding alkaloids. These derivatives may give salts of mineral acids (hydrochloride, etc.) but these salts are but slightly soluble in water. Thus the products obtained have a special lipoid tropism character.

3. Owing to the fact that they and their salts are almost insoluble in water, these derivatives have a slower physiological action and therefore a delayed effect.

It should be understood that the invention is not limited to the modes of operation described which have been given merely by way of example.

Having now described my invention what I claim as new and desire to secure by Letters Patent is:

1. A compound selected from the group consisting of the esterified derivatives of hydroxylated alkaloids of formula:

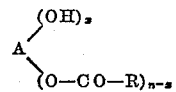

and the addition salts of these esterified derivatives and non-toxic acids, in which Formula A is the radical of an alkaloid A(OH)$n$ selected from the group consisting of morphine, peronine, codeine, atropine, boldine, ephedrine and quinine, $n$ is an integer selected from 1 and 2, $x$ is an integer selected from 0 and 1, and R is the radical of a fatty acid RCOOH having from eight to twenty-two inclusive carbon atoms.

2. Dimyristyl-morphine.
3. Myristyl-atropine.
4. Myristyl-ephedrine.
5. Myristyl-codeine.
6. Myristyl-peronine.

References Cited in the file of this patent

Braun: Berichte, vol. 47, pp. 2312–16 (1914). The Merck Index (6th ed., 1952), pp. 651, 652 and 108.

White: J. Am. Chem. Soc., vol. 73, pp. 492–493 (1951).